UNITED STATES PATENT OFFICE.

THOMAS DANIEL KELLY, OF HOVE, ENGLAND.

CEMENTING MATERIAL.

1,262,512.     Specification of Letters Patent.     Patented Apr. 9, 1918.

No Drawing.     Application filed June 27, 1917. Serial No. 177,373.

*To all whom it may concern:*

Be it known that THOMAS DANIEL KELLY, a subject of the King of Great Britain, residing at Hove, Sussex, England, has invented certain new and useful Improvements in Cementing Material, of which the following is a specification.

A very tough cementing material which is not brittle and will practically stick anything, and is proof against extremes of heat or cold, such as fire or frost, water, oil and acids, is made by mixing a liquid, insoluble in water, but strongly adhesive, such as oxidized, or polymerized oils, which are not easily saponified with water glass, and then adding hydrated Portland cement. The oxidized or polymerized oils used may be Chinese wood or tung oil, crude mineral oils, such as crude petroleum, and other analogous oils.

To this mixture while plastic, any aggregate or filling material which is not of a greasy or oily nature, is added and the whole compressed in molds of the desired shape, or if used in large areas, compressed *in situ* by means of rollers and leveled and faced by sliding irons as used for ordinary asphalt. Oils which are not adhesive should not be used as they detract from the strength.

The material while plastic is reinforced in addition to or instead of compressing with iron or steel bars, plates, strips, wire or like strengthening materials.

In the case of large areas such reinforcement is added before facing and leveling.

The setting of the material is accelerated by heat, and unlike ordinary cement concrete does not powder, nor expand, nor contract at high temperatures, in fact after being subjected to a temperature of 2000° F. for six hours was found to be perfectly waterproof, as hard as before and no trace of expansion or cracking.

The approximate proportions are as follows:—

| | |
|---|---|
| Adhesive liquid | 5 to 10 parts. |
| Water glass | 5 to 30 parts. |
| Cement | 100 to 300 parts. |
| Filling material | 500 to 1000 by bulk. |

What I do claim as my invention, and deside to secure by Letters Patent, is:—

1. The improved fireproof, waterproof, and acid proof cementing material made by mixing water glass with an adhesive liquid insoluble in water, and not easily saponified, and hydrated Portland cement.

2. The improved fireproof, waterproof, and acid proof material, made by mixing water glass with an adhesive liquid insoluble in water, and not easily saponified, and hydrated Portland cement and a suitable filling material.

In testimony whereof I have hereunto set my hand in presence of two subscribing witnesses.

THOMAS DANIEL KELLY.

Witnesses:
    WM. O. BROWN,
    J. M. DE LOS ORIOS.

Copies of this patent may be obtained for five cents each, by addressing the "Commissioner of Patents. Washington, D. C."